United States Patent
Pratt et al.

(10) Patent No.: US 8,320,866 B2
(45) Date of Patent: *Nov. 27, 2012

(54) INTEGRATED CIRCUITS, COMMUNICATION UNITS AND METHODS OF CANCELLATION OF INTERMODULATION DISTORTION

(75) Inventors: Patrick Pratt, Cork (IE); William Plumb, Cambridge (GB); Sophie Gault, Cambridge (GB); Pei-Shiun Chung, Taipei Hsien (TW)

(73) Assignee: MediaTek Singapore Pte. Ltd., Singapore (SG)

(*) Notice: Subject to any disclaimer, the term of this patent is extended or adjusted under 35 U.S.C. 154(b) by 430 days.

This patent is subject to a terminal disclaimer.

(21) Appl. No.: 12/704,499

(22) Filed: Feb. 11, 2010

(65) Prior Publication Data

US 2011/0195673 A1 Aug. 11, 2011

(51) Int. Cl.
  *H04B 1/10* (2006.01)
  *H03D 1/06* (2006.01)
(52) U.S. Cl. ............... 455/295; 455/63.1; 455/67.13; 455/78; 375/346
(58) Field of Classification Search .......... 455/63.1, 455/67.13, 78, 83, 295, 296, 307, 333, 334; 375/346, 348, 350
See application file for complete search history.

(56) References Cited

U.S. PATENT DOCUMENTS

| | | | | |
|---|---|---|---|---|
| 6,496,064 | B2* | 12/2002 | Rzyski | 330/149 |
| 7,876,867 | B2* | 1/2011 | Filipovic et al. | 375/346 |
| 8,098,779 | B2* | 1/2012 | Komninakis et al. | 375/346 |
| 8,150,350 | B2* | 4/2012 | Pratt et al. | 455/209 |
| 2008/0232268 | A1 | 9/2008 | Kahrizi | |

OTHER PUBLICATIONS

Dufrene, Adaptive IP2 calibration scheme for direct-conversion receivers, Radio and Wireless Symposium, pp. 111-114, 2006 IEEE, 2006.
Aparin, An Integrated LMS Adaptive Filter of TX Leakage for CDMA Receiver Front Ends, IEEE Journal of Solid-State Circuits, pp. 1171-1182, vol. 41, No. 5, May 2006.

* cited by examiner

*Primary Examiner* — Quochien B Vuong
(74) *Attorney, Agent, or Firm* — Winston Hsu; Scott Margo

(57) ABSTRACT

A wireless communication unit includes a transmitter, a receiver, a selectivity element and a baseband processing module. The receiver has at least one summation module arranged to add a cancellation signal to the quadrature baseband receive signal. a baseband processing module arranged to: receive the quadrature baseband transmit signal and quadrature baseband receive signal; apply independent gain and phase adjustments to quadrature portions of the quadrature baseband transmit signal, based on at least one signal component of the quadrature baseband receive signal, to form independent cancellation signals; and apply the independent cancellation signals to the at least one summation module.

19 Claims, 8 Drawing Sheets

INTEGRATED CIRCUITS, COMMUNICATION UNITS AND METHODS OF CANCELLATION OF INTERMODULATION DISTORTION

FIELD OF THE INVENTION

The field of this invention relates to integrated circuits, communication units and methods of cancellation of intermodulation distortion. The invention is applicable to, but not limited to, second order intermodulation product distortion cancellation in integrated circuits and wireless communication units.

BACKGROUND OF THE INVENTION

For many years frequency division duplex (FDD) and time division duplex (TDD) have been the two methods of choice for handling uplink (UL) and downlink (DL) transmissions in wireless systems. FDD uses two different frequencies for the UL and DL thereby separating them in frequency whereas TDD utilises a single frequency for both UL and DL signals and separates them in time. Therefore, in order to meet the performance requirements of a number of telecommunications standards, integrated circuits (ICs) and/or communication units have been designed to utilise frequency division duplex (FDD) techniques as a mechanism to separate UL/DL transmit and receive communications.

As a consequence, and particularly at typical wireless communication frequencies where the transmit (and therefore receive) frequency is very high, such as in the 1 GHz frequency region in the third generation (3G) wideband code division multiple access (WCDMA) standard, it is known that interference is caused by poor isolation between the transmitted and received signals at these very high frequencies within the ICs or communication units. Here, the transmit signal leaks through the duplex filter and mixes via the mechanism of second order distortion within the receive mixer to baseband, thereby resulting in degraded receive signal to noise ratio (SNR) performance. This causes an effective desensitization of the receiver. The problem becomes critical when the transmitter is operating at, or near, the transmitter's maximum transmit power capability whilst the receiver is operating at, or near, its minimum receive power capability, referred to as the receiver's 'sensitivity'. In this scenario, such $2^{nd}$ order intermodulation products can 'desense' the radio and lead to bit-error-rate (BER) failure. Second order intermodulation distortion (IM2 or IIP2) occurs when two signals mix with each other through a second order nonlinearity to produce an intermodulation product at the sum and difference frequencies of the two interferers.

FIG. 1 schematically illustrates known circuitry and a cause of such $2^{nd}$ order intermodulation product interference effects in a high frequency communication unit 100. The high frequency communication unit 100 comprises digital baseband 'I' and 'Q' signals 102 being input to a transmit digital-to-analogue converter (TX DAC) 105, where the digital baseband 'I' and 'Q' signals 102 are converted to analogue baseband 'I' and 'Q' signals and filtered in low pass filter (LPF) 110. The filtered baseband signals are then up-converted in frequency using a mixer stage 115 coupled to a local oscillator (LO) 120, such that the filtered baseband signals are translated in frequency to the frequency of the LO signal provided the LO 120. The up-converted signal output from the mixer stage 115 is input to a power amplifier (PA) 125, where it is amplified to a sufficiently high radio frequency level to be radiated from antenna 135. The antenna 135 is coupled to a (transmit (Tx)/receive (Rx)) duplex filter 130 which attempts to attenuate signals received from the transmit path from entering the communication unit's receive path. However, given the limitations of filtering technology at such high radio frequencies, a significant amount of the transmit signal is leaked 140 into the receiver path.

Thus, in the receive path, the antenna 135 and Tx/Rx duplex filter 130 route received high frequency signals to a low noise amplifier (LNA) 145. The amplified high frequency signal is input to a quadrature down-mixer 150, which down-converts the amplified signal by multiplying it with a quadrature shifted 155 local oscillator (LO) signal that is fed from a LO source 160. The outputs from the quadrature down-mixer 150 are at baseband frequencies, such that low-pass or band-pass filtering (LPF/BPF) 165 can be used to remove or attenuate undesired signals in the frequency domain. The baseband signals may be at a low frequency (LF) signal, a very low intermediate frequency (VLIF) signal or even a DC (zero IF) signal. Baseband (analogue) filtered signals are then digitised in the receive analogue-to-digital converter (RX ADC) 170 and filtered again to remove quantization effects in filter 175. Graph 185 illustrates how the performance of the receiver is de-sensitised (often referred to as 'desense') by the leakage of the transmit signal into the receive path, with most of the desense effect occurring in the receive down-mixer stage. The performance reduction is measured in terms of 'desense' and ultimately bit error rate (BER) and is due to a presence of IMD2 products in the baseband signal.

The classical solution to minimising the level of transmit signal leaking into the receive path uses a surface acoustic wave (SAW) filter. However, the use of SAW filters is no longer acceptable due to their large size and high cost factors, coupled to the ever-increasing need to minimise product cost and size, particularly in the mobile telephone handset business.

One attempted solution has been to use an integrated narrow bandwidth, tuneable band-pass or notch type filter, to replace the functionality of the SAW filter. However, this solution suffers from the need to use multiple lumped element inductors.

A yet further alternative approach is to employ a calibration scheme that trims the receive down-mixer operation for maximum IIP2 across process, voltage and temperature (PVT) variation. However, it is believed that this approach may not be effective, as analogue radio frequency designs do not cope well across PVT. Furthermore, there is a concern that the addition of a dedicated trimming port could potentially compromise other key RF metrics.

One known example of cancellation of second order intermodulation products is illustrated in FIG. 2. As shown, the digital baseband 'I' and 'Q' signals 102 are also input to an adaptive intermodulation distortion (IMD) cancellation function 215. The IMD cancellation function 215 is arranged to provide a digital estimate (in signals 220, 225) of the transmitter second order intermodulation distortion components of the communication unit. Thereafter, the digital estimate (in signals 220, 225) of the transmit second order intermodulation distortion components are subtracted from the signals output from filter 175 in subtraction blocks 230, 235, thereby (in principle) removing a portion of the second order intermodulation distortion components that have been created in the receive path as a result of leakage of the transmit signal through the duplex filter 130. In this manner, the estimation of interference is based on a correlated reference. Thus, the technique of FIG. 2 generates an error signal after DC correction of the receive signal, and uses this error signal to train the adaptive interference cancellation in IMD cancellation function 215. Thereafter, the cancellation is adapted so as to minimise the mean squared power of the estimation error.

There are some disadvantages that exist in the related art, such as the selectivity of the receiver performance (when a bandwidth (BW) is, say, <100 Hz) comes at a disadvantage of too slow a settling time, for example due to any averaging technique used. Hence, a designer in considering DC correction techniques is confronted with a trade off between selectivity versus settling time. A further disadvantage that exists in the related art is that a common 'I' and 'Q' path and hence a single gain stage are used to control the cancellation signal. A yet further disadvantage that exists in the related art is that a fixed (and therefore rigid) value of adaptation rate is selected to work across the power range of the communication unit.

Thus, a need exists for improved integrated circuits, communication units and methods of cancellation therefor.

SUMMARY OF THE INVENTION

Accordingly, the invention seeks to mitigate, alleviate or eliminate one or more of the above mentioned disadvantages singly or in any combination. Aspects of the invention provide improved integrated circuits, communication units and methods therefor as described in the appended claims.

According to a first aspect of the invention, there is provided a wireless communication unit comprises a transmitter arranged to process a quadrature baseband transmit signal to produce a first radio frequency signal for wireless transmission. The wireless communication unit comprises a receiver arranged to receive a second radio frequency signal and convert the second radio frequency signal to a quadrature baseband receive signal, wherein the receiver comprises at least one summation module arranged to add a cancellation signal to the quadrature baseband receive signal. The wireless communication unit comprises a selectivity element that is arranged to couple the transmitter and the receiver to an antenna, such that a reduced portion of the first radio frequency signal is introduced into the second radio frequency signal thereby creating a second order inter-modulation distortion component in the baseband receive signal. The wireless communication unit further comprises a baseband processing module arranged to: receive the quadrature baseband transmit signal and quadrature baseband receive signal; apply independent gain and phase adjustments to quadrature portions of the quadrature baseband transmit signal, based on at least one signal component of the quadrature baseband receive signal, to form independent cancellation signals; and apply the independent cancellation signals to the at least one summation module.

In this manner, an enhanced second order intermodulation model, with independent phase and gain adjustment, may be generated in order to provide a more accurate cancellation of IMD2 products.

According to an optional feature of the invention, the baseband processing module may comprise a plurality of independent adaptive filters. The plurality of independent adaptive filters may comprise multi-tap finite impulse response (FIR) filters arranged to compensate for a mismatch error between the quadrature baseband receive signal and the quadrature baseband transmit signal.

According to an optional feature of the invention, the wireless communication unit may comprise a power measurement module operably coupled to the adaptive estimator module and arranged to measure an on-channel power level of the baseband receive signal. The adaptive estimator module comprises a baseband processing module arranged to determine an adaptation rate to be used by the adaptive estimator module in generating the cancellation signal based on the measured on-channel power level of the baseband receive signal. In this manner, a mechanism is described that provides an automatic regulation of adaptation rate to reduce second order intermodulation distortion.

According to an optional feature of the invention, the baseband processing module may be arranged to ignore uncorrelated noise components, such that the cancellation signal cancels second order intermodulation distortion component.

According to an optional feature of the invention, the receiver may comprise an analogue-to-digital converter operably coupled to the summation module. The receiver may further comprise a digital filter located in the receiver and arranged to filter signals output from the summation module; and the adaptive estimator module may be arranged to receive the output filtered signals and the baseband transmit signal and produce the cancellation signal based thereon. In this manner, the cancellation node may be appropriately partitioned across the baseband filtering elements.

According to an optional feature of the invention, the digital filter may be a digital adjacent channel filter, which may comprise a matching filter.

According to an optional feature of the invention, the wireless communication unit may further comprise a controller module arranged to perform cross-correlation of at least one tap of each of the first baseband transmit signal and the cancellation signal to produce an error signal that is representative of a time difference therebetween. The wireless communication unit may further comprise a controllable delay element operably coupled to the controller module and arranged to use the error signal to set a time delay applied to at least one from a group of: the first baseband transmit signal, the cancellation signal. In this manner, a self-tuning time alignment system may be obtained.

According to an optional feature of the invention, the controller module may be arranged to perform cross correlation between two signals evaluated at a number of lag points.

According to an optional feature of the invention, the controller module may be arranged to adjust the controllable delay element until the error signal is at a minimum.

According to a second aspect of the invention, there is provided an integrated circuit for a wireless communication unit. The integrated circuit comprises a transmitter arranged to process a quadrature baseband transmit signal to produce a first radio frequency signal for wireless transmission. A receiver is arranged to receive a second radio frequency signal comprising a reduced portion of the first radio frequency signal and convert the second radio frequency signal to a quadrature baseband receive signal, wherein the receiver comprises at least one summation module arranged to add a cancellation signal to the quadrature baseband receive signal, and wherein the reduced portion of the first radio frequency signal creates a second order inter-modulation distortion component in the baseband receive signal. A baseband processing module is arranged to receive the quadrature baseband transmit signal and quadrature baseband receive signal; apply independent gain and phase adjustment to quadrature portions of the quadrature baseband transmit signal, based on at least one signal component of the quadrature baseband receive signal, to form independent cancellation signals; and apply the independent cancellation signals to the at least one summation module.

According to a third aspect of the invention, there is provided a method for reducing a second order inter-modulation distortion component in a wireless communication unit. The method comprises processing a quadrature baseband transmit signal to produce a first radio frequency signal for wireless transmission; and receiving a second radio frequency signal comprising a reduced portion of the first radio frequency signal that creates a second order inter-modulation distortion component in the baseband receive signal. The method further comprises converting the second radio frequency signal to a quadrature baseband receive signal; applying independent gain and phase adjustments to quadrature portions of the quadrature baseband transmit signal, based on at least one signal component of the quadrature baseband receive signal, to form independent cancellation signals; and adding the independent cancellation signals to the quadrature baseband receive signal to reduce the second order inter-modulation distortion component.

According to a fourth aspect of the invention, there is provided a computer program product comprising executable program code for reducing a second order inter-modulation distortion component in a wireless communication unit. The executable program code is operable for processing a quadrature baseband transmit signal to produce a first radio frequency signal for wireless transmission; and receiving a second radio frequency signal comprising a reduced portion of the first radio frequency signal that creates a second order inter-modulation distortion component in the baseband receive signal. The executable program code is further operable for converting the second radio frequency signal to a quadrature baseband receive signal; applying independent gain and phase adjustments to quadrature portions of the quadrature baseband transmit signal, based on at least one signal component of the quadrature baseband receive signal, to form independent cancellation signals; and adding the independent cancellation signals to the quadrature baseband receive signal to reduce the second order inter-modulation distortion component.

These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

Examples of the invention will be described in terms of a wireless communication unit that supports code division multiple access communications. However, it will be appreciated by a skilled artisan that some concepts herein described may be embodied in any type of wireless communication unit and may, thus, not be limited to a CDMA communication unit.

Figure 1:
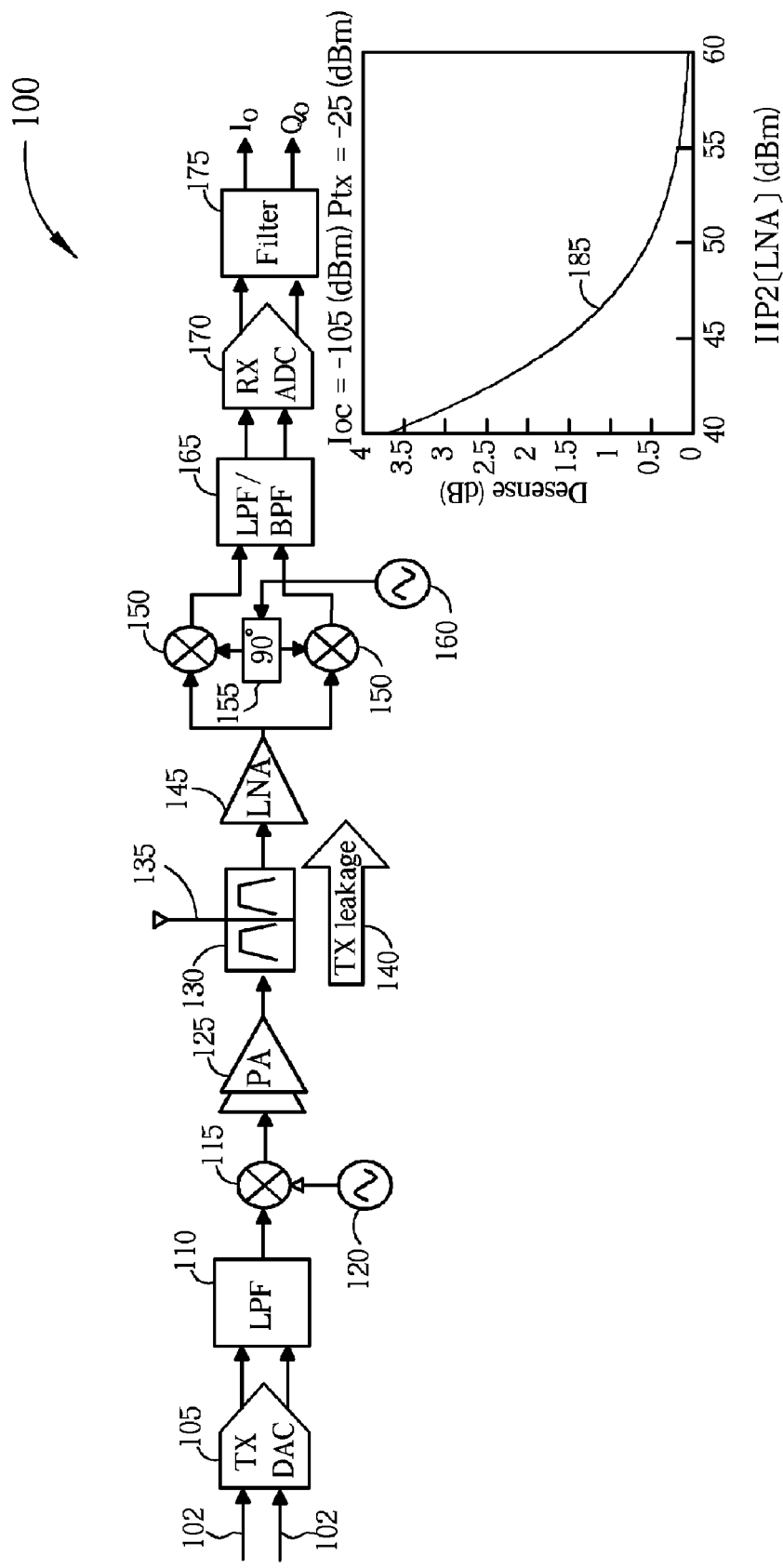
FIG. 1 illustrates a high level block diagram of a communication unit illustrating a known problem with second order intermodulation distortion.
Figure 2:
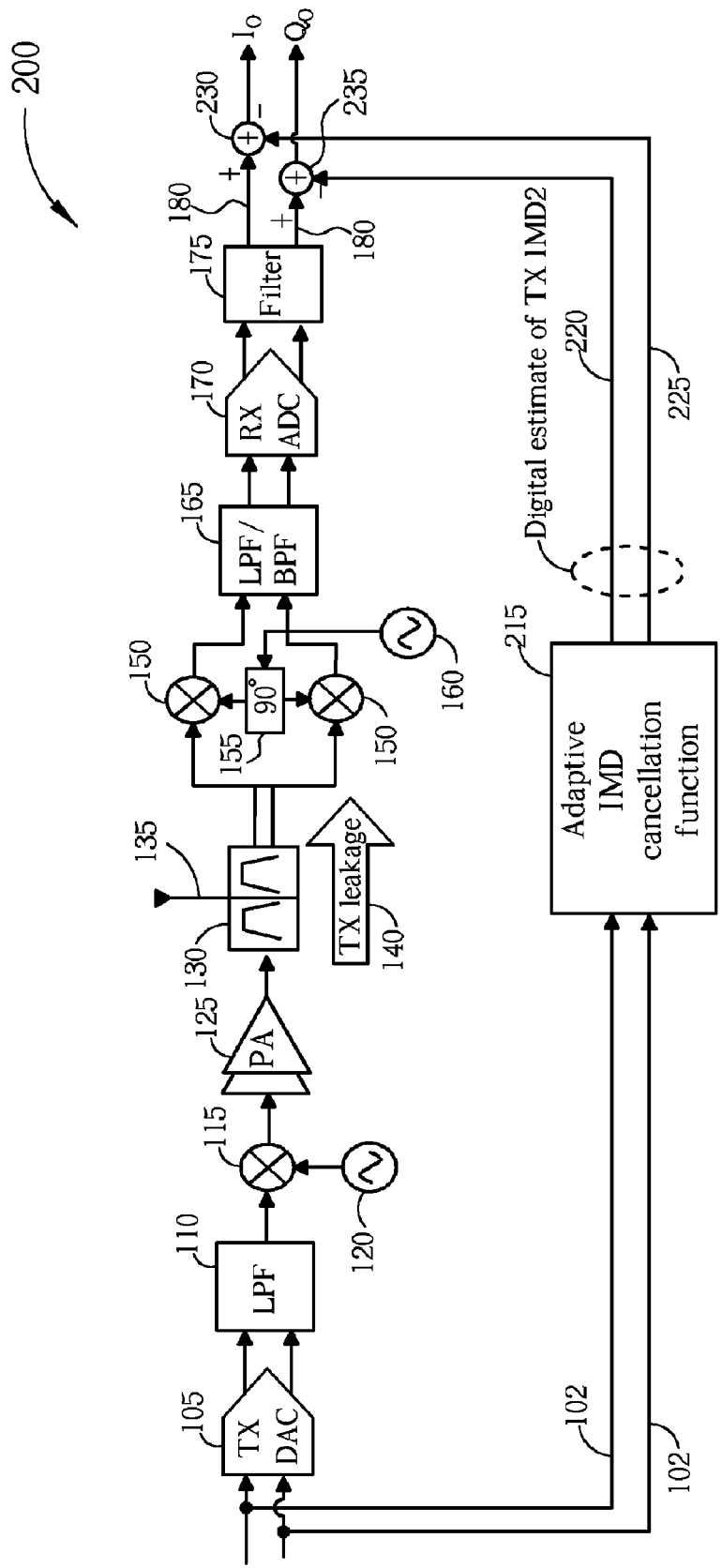
FIG. 2 illustrates a high level block diagram of a communication unit illustrating a known potential solution to the second order intermodulation distortion problem.
Figure 3:
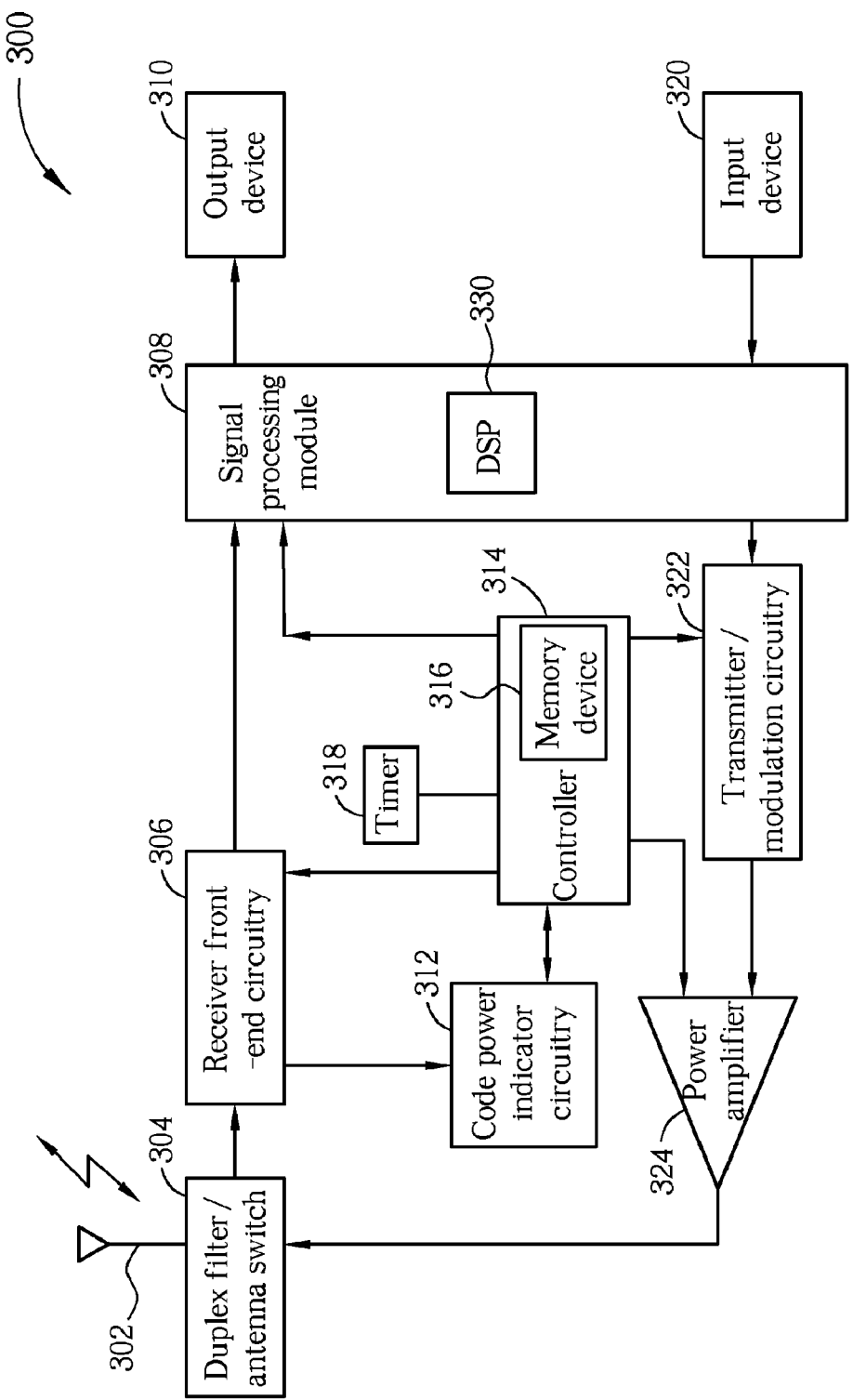
FIG. 3 illustrates a high level block diagram of an example communication unit adapted to implement embodiments of the invention.

Referring first to FIG. 3, a block diagram of a wireless communication unit (sometimes referred to as a mobile subscriber unit (MS) in the context of cellular communications or user equipment (UE) in terms of a $3^{rd}$ generation partnership project (3GPP) communication system) is shown, in accordance with example embodiments of the invention. The wireless communication unit 300 contains an antenna 302 preferably coupled to a duplex filter or antenna switch 304 that provides isolation between receive and transmit chains within the wireless communication unit 300.

The receiver chain, as known in the art, includes receiver front-end circuitry 306 (effectively providing reception, filtering and intermediate or base-band frequency conversion). The front-end circuitry 306 is serially coupled to a signal processing module 308. An output from the signal processing module 308 is provided to a suitable output device 310, code power indicator (RSCP) circuitry 312, which in turn is coupled to a controller 314 that maintains overall subscriber unit control. The controller 314 may therefore receive bit error rate (BER) or frame error rate (FER) data from recovered information. The controller 314 is also coupled to the receiver front-end circuitry 306 and the signal processing module 308 (generally realised by a digital signal processor (DSP) 330). The controller is also coupled to a memory device 316 that selectively stores operating regimes, such as decoding/encoding functions, synchronisation patterns, code sequences, RSSI data and the like.

In accordance with examples of the invention, the memory device 316 stores filter information, such as adaptive filter co-efficients, linear transmit-receive gain values, time alignment settings, adaptation rate values, dc filter tuning rate, etc. At a higher level the memory device 316 may stores will be the whole state machine data/code, which configures and controls the lower level h/w. Thus, data contained in the memory device 316 may be used by the wireless communication unit 300 and processed by signal processing module 308. Furthermore, a timer 318 is operably coupled to the controller 314 to control the timing of operations (transmission or reception of time-dependent signals) within the wireless communication unit 300.

As regards the transmit chain, this essentially includes an input device 320, such as a keypad, coupled in series through transmitter/modulation circuitry 322 and a power amplifier 324 to the antenna 302. The transmitter/modulation circuitry 322 and the power amplifier 324 are operationally responsive to the controller 314.

The signal processor module in the transmit chain may be implemented as distinct from the processor in the receive chain. Alternatively, a single processor module 308 may be used to implement processing of both transmit and receive signals, as shown in FIG. 3. Clearly, the various components within the wireless communication unit 300 can be realised in discrete or integrated component form, with an ultimate structure therefore being merely an application-specific or design selection.

Figure 4:
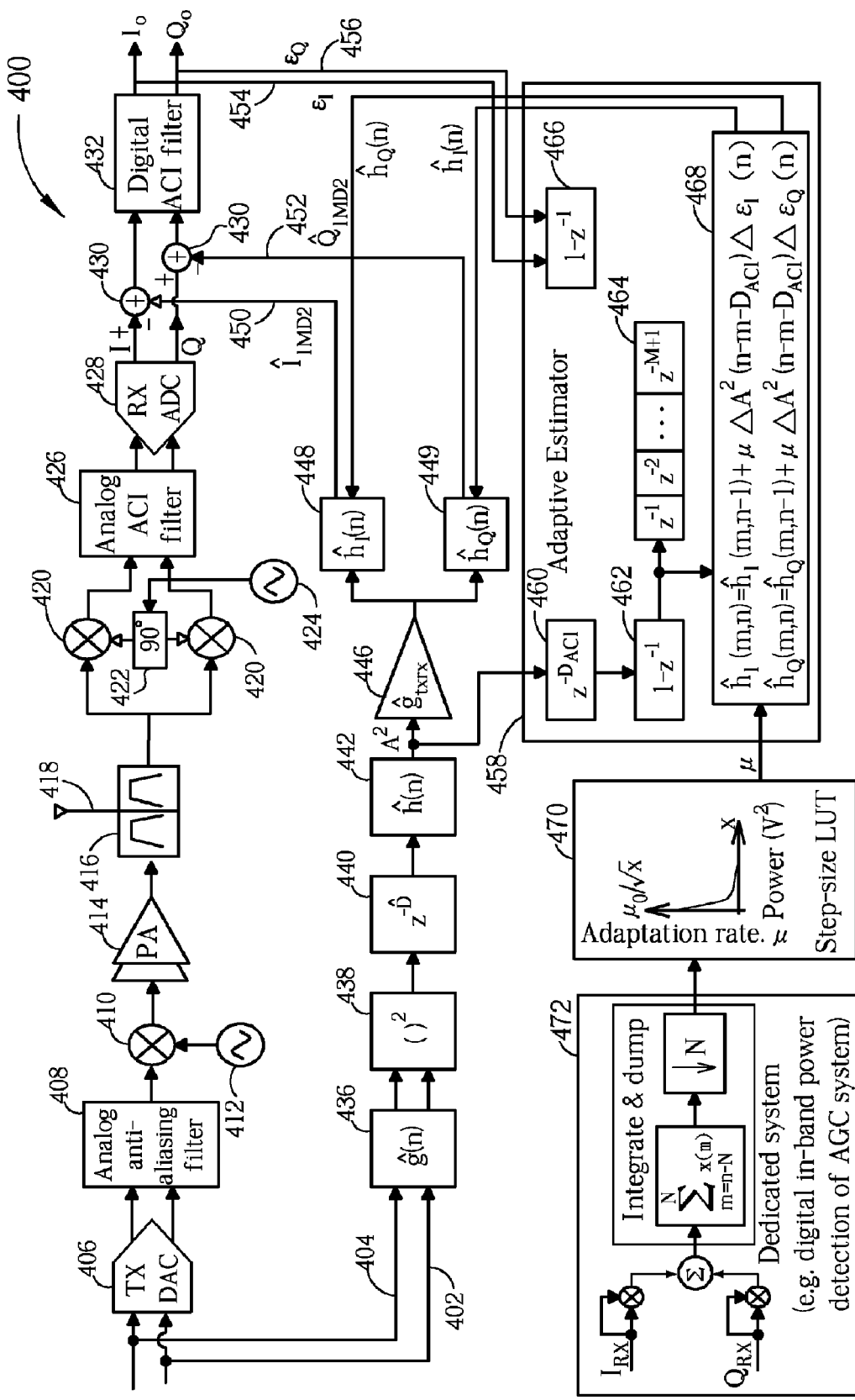
FIG. 4 illustrates a more detailed functional block diagram of an example communication unit adapted to implement embodiments of the invention.

Referring now to FIG. 4, a more detailed functional diagram of an example of a wireless communication unit 400 is illustrated. The wireless communication unit 400 comprises digital baseband 'I' and 'Q' signals 402, 404 being input to a transmit digital-to-analogue converter (TX DAC) 406, where the digital baseband 'I' and 'Q' signals 402, 404 are converted to analogue baseband 'I' and 'Q' signals and filtered in low-pass analogue anti-aliasing filter 408. The filtered baseband signals are then up-converted in frequency using a mixer stage 410 coupled to a local oscillator (LO) 412, such that the filtered baseband signals are translated in frequency to the frequency of the LO signal provided the LO 412. The up-converted signal output from the mixer stage 410 is input to a power amplifier 414, where it is amplified to a sufficiently high radio frequency level to be radiated from antenna 418. The antenna 418 is coupled to a (transmit (Tx)/receive (Rx)) duplex filter 416, which attempts to attenuate signals received from the transmit path from entering the communication unit's receive path. However, given the limitations of filtering technology at such high radio frequencies, a significant amount of the transmit signal may be leaked into the receiver path. In the receive path, the antenna 418 and Tx/Rx duplex filter 416 route received high frequency signals to a low noise amplifier (not shown). The amplified high frequency signal is input to a quadrature down-mixer 420, which down-converts the amplified signal by multiplying it with a quadrature shifted 422 local oscillator (LO) signal that is fed from a LO source 424. The outputs from the quadrature down-mixer 420 are at baseband frequencies, such that analogue low-pass or band-pass filter (LPF/BPF) 426 can be used to remove (or substantially attenuate) undesired adjacent channel interfering (ACI) signals in the frequency domain.

The baseband signals may be at a low frequency (LF) signal, a very low intermediate frequency (VLIF) signal or even a DC (zero IF) signal. Baseband (analogue) filtered signals are then digitised in the receive analogue-to-digital converter (RX ADC) 428.

In accordance with one example embodiment, the digital transmit, 'I' and 'Q' samples 402, 404 are tapped off prior to the transmit DAC 406 and filtered by $\hat{g}(n)$ filter 436, where $\hat{g}(n)$ is arranged to be a model of the composite (e.g. the digital plus analogue) filtering that is present along the transmit path between the tap-off, reference point and the transmit radio frequency port (at the antenna 418). In one example embodiment, the $\hat{g}(n)$ filter 436 is a fixed, predetermined filter, assumed to be known apriori. In this example embodiment, the modulus or amplitude, squared; $I^2+Q^2$, of the filtered transmit baseband signals is then calculated in squaring module 438 and delayed by a programmable digital tapped delay line module, $z^{-\hat{D}}$, 440. One purpose of programmable digital tapped delay line module, $z^{-\hat{D}}$, 440 is to synchronise the digital estimate to the actual IMD2 product at the point of cancellation.

In one example embodiment, the transmit-to-receive group delay variation arising from the associated analogue filter variation may be sufficiently low that a fixed programmable delay of resolution better than, say, a ¼ chip period could be sufficient. Accordingly, the delay line value $\hat{D}$ can be set by an upper layer of configuration firmware or software. In alternative examples, the delay line value $\hat{D}$ may be set using programmable delay elements.

The synchronised amplitude squared signal output from squaring module 438 is then filtered in digital filter 442 by $\hat{h}(n)$, which models the composite baseband filtering along the receive path, including, for example, analogue receive filter(s), ADC signal transfer dynamics, any CIC decimation filters, any digital compensation/decimation modules and any receive channel square root raised cosine (SRRC) filter. As in the transmit case, $\hat{h}(n)$ may be configured as a predetermined, fixed filter, whose value is determined off-line from laboratory characterised data.

The synchronized, filtered amplitude squared signal is then scaled in scaling module 446 by the deterministic gain value $\hat{g}_{txrx}$, which represents the known apriori gain from the digital TX tap-off point to the digital cancellation point. Scaling module 446, scaling the synchronized, filtered amplitude squared signal by $\hat{g}_{txrx}$, comprises the known gain along the transmit path from the digital baseband to the transmitter port of the duplexer (or duplex filer) 416, the (worst case) duplexer transmit-receive isolation, and front-end receiver (linear) gain (for example dominated by the LNA (not shown) and the known gain from the down-mixer stage 420 to the digital baseband cancellation point (e.g. predominantly the gain from AGC gain (also not shown for clarity purposes)). In one example embodiment, this gain may be set dynamically by an upper layer of firmware or software, based on the actual gain through the transmit path (which in turn is based on the transmit target output power) and the AGC setting.

The final stage of the cancellation path compromises two, low order, adaptive finite impulse response (FIR) filters, $\hat{h}_I(n)$ 448 and $\hat{h}_Q(n)$ 449 for the 'I' and 'Q' paths respectively. An FIR filter is a type of digital filter where the filter's impulse response to a Kronecker delta input, is finite because it settles to zero in a finite number of sample intervals. The impulse response of an Nth-order FIR filter lasts for N+1 samples, and then dies to zero. The purpose of the adaptive FIR filters 448, 449 is primarily to model the actual IMD2 gain through the receive mixer-stages, in addition to reducing or removing any gain uncertainty associated with the predetermined scalar gain $\hat{g}_{txrx}$, that is associated with the estimate of the duplexer transmit-receive isolation and the remaining gain through the transmit and receive paths. In addition, in one example, the adaptive FIR filters, $\hat{h}_I(n)$ 448 and $\hat{h}_Q(n)$ 449 are also responsible for minimizing any phase uncertainty and residual time misalignment accruing from the mis-modelling of the transmit and receive filters ($\hat{g}(n)$ 436 and $\hat{h}(n)$ 442 respectively). Furthermore, in one example, the provision of two independent adaptive FIR filters, $\hat{h}_I(n)$ 448 and $\hat{h}_Q(n)$ 449 may allow for a more complex IMD2 model, beyond that of a standard gain relationship. In particular, such a structure may facilitate the 'I' and 'Q' paths having an independent IMD2 phase response, (whereas the classical or conventional filter model allows for only an independent gain response and assumes a common phase response along both paths).

In this example, the outputs $\hat{I}_{IMD2}$ 450 and $\hat{Q}_{IMD2}$ 452 of the adaptive FIR filters, $\hat{h}_I(n)$ 448 and $\hat{h}_Q(n)$ 449, provide the complex baseband estimate of the IMD2 product, which is subtracted from the actual received 'I' and 'Q' values in the receive path in subtraction modules 430, as shown, to generate a cancelled (or corrected) complex signal. The cancelled (or corrected) complex signal is filtered in digital adjacent channel interference (ACI) filter 432.

In one example embodiment, the filtered cancelled (or corrected) complex signal also becomes the error for the adaptive update equation.

Figure 5:
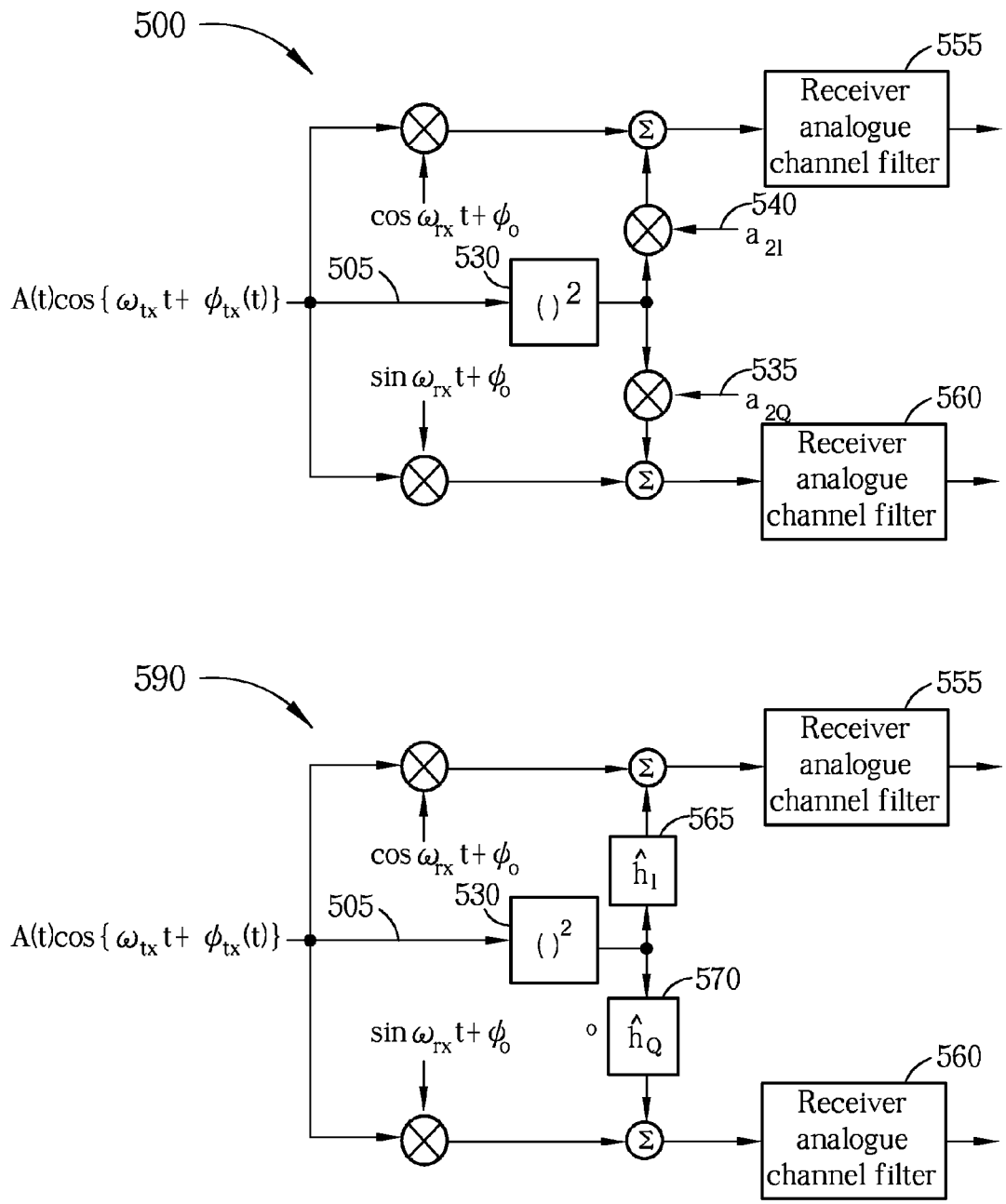
FIG. 5 illustrates examples of a construction of a second order intermodulation distortion (IMD2) model.

Modelling of IMD2 Factors Using Independent 'I' and 'Q' Adjustments:

An important factor in the accurate implementation of the adaptive canceller is the modelling of the IMD2 path from the transmit baseband circuitry to the receive baseband circuitry. Referring now to FIG. 5, an example of the construction of a second order intermodulation distortion (IMD2) basic model 500 to achieve this is presented.

Due to finite isolation of the duplexer 416 of FIG. 4, a certain amount of the transmit power will leak through to the receive port. Referring to FIG. 5, the leaked transmit signal 505 can be expressed as:

$$A(t)\cos\{\omega_{tx}t+\phi_{tx}(t)\} \quad [1]$$

where:

A is the envelope or amplitude modulated component of the transmit radio frequency signal, $\omega_{tx}$ is the carrier frequency of the transmit radio frequency signal, and $\phi_{tx}$ is the phase modulated component of the transmit radio frequency signal.

Phase offsets, carrier offsets, phase errors and all other impairments and transmitter imperfections have been ignored for the purpose of this explanation of the 'basic' model 500. Parasitic coupling paths of the transmit to both the radio frequency input port and the local oscillator port of the Rx mixer-stage in addition to any other parasitic coupling path produces, in the leakage signal, self mixing. This gives rise to the characteristic squaring or second order effect, which in effect results in an output composed of a baseband signal that is proportional to:

$$A^2/2 \quad [2]$$

and a radio frequency term at twice the transmit carrier frequency proportional to:

$$0.5A^2(t)\cos\{2\omega_{tx}t+2\phi_{tx}(t)\}. \quad [3]$$

The receiver analogue channel filters 555, 560 remove the radio frequency component, which leaves the baseband term proportional to the leaked transmit amplitude modulation (AM) level, squared. The phase component of the transmit leakage is effectively stripped off by the squaring effect in squaring module 530 with the amount of amplitude modulated squared power level that mixes to baseband being determined by the IIP2 of the mixer-stage. The weighting or gain terms, $a_{2I}$ 540 and $a_{2Q}$ 535 are introduced for both the 'I' and 'Q' path to model this scaling effect, resulting in the basic expressing for the IMD2 term:

$$IMD_2 = A^2(a_{2I}+ja_{2Q}) \quad [4]$$

The weighting or 'a2 coefficients' can be reconciled with the conventional definition of IIP2, as illustrated in equation [5]:

$$IIP_2(dBVrms) = -20\log_{10}\sqrt{2}|a_2| \quad [5]$$

where:

$$a_2 = \sqrt{a_{2I}^2 + a_{2Q}^2}. \quad [6]$$

Thus, once the actual mixer-stage IIP2 performance has been calculated, it is also possible to calculate the equivalent 'a2' coefficients. Furthermore, as the radio frequency envelope is simply a scaled, delay and/or filtered version of the original transmit amplitude modulation signal, in principle, and once this scaling and filtering is known, it is possible to evaluate the amplitude modulated squared term and the corresponding instantaneous IMD2 time series. Thus, the 'basic' model 500 and equations [4] to [6] encapsulate the conventional definition and model of IM2, which is limited. The inventor has recognised and appreciated that in some instances, the basic model may be insufficient and instead of being limited to a pure gain along the 'I' and 'Q' IM2 paths independent filters may be used.

Referring now to the second diagram in FIG. 5, an example of the construction of a second order intermodulation distortion (IMD2) extended model 590 is presented. In particular, the extended model 590 addresses any potentially inadequate calculation of the common phase response along both the 'I' and 'Q' IMD2 path. The example extended model includes an independent, low order FIR structure 565, 570, which has been incorporated on each respective path to allow a different phase response along each path. As shown in the second diagram of FIG. 5, the single 'a2' coefficient is now replaced by a low order FIR structure 565, 570, such that the past and present amplitude modulated squared values are used in the evaluation of the instantaneous IMD2. Moreover, in one example, the coefficients for the respective FIR taps are configurable in order to track out uncertainty and time-varying modelling errors that are associated with the transmit baseband analogue anti-imaging and receive filtering. The low order FIR structure 565, 570 are adaptive and updated dynamically and are, for example, of an FIR form:

$$\hat{H}_I(z^{-1}) = \sum_{m=0}^{M-1} \hat{h}_I(m)z^{-m} \quad [7]$$

Using this structure, the extended IMD2 model becomes:

$$IMD_2(n) = \sum_{m=0}^{M-1} \hat{h}_I(m)A^2(n-m) + j\sum_{m=0}^{M-1} \hat{h}_Q(m)A^2(n-m) \quad [8]$$

It is noted that the classical (basic) IMD2 model is a special case of the extended model in equation [8], where M=1, such that:

$$\hat{a}_{2I} = \hat{h}_I(0) \text{ and}$$

$$\hat{a}_{2Q} = \hat{h}_Q(0)$$

Figure 6:
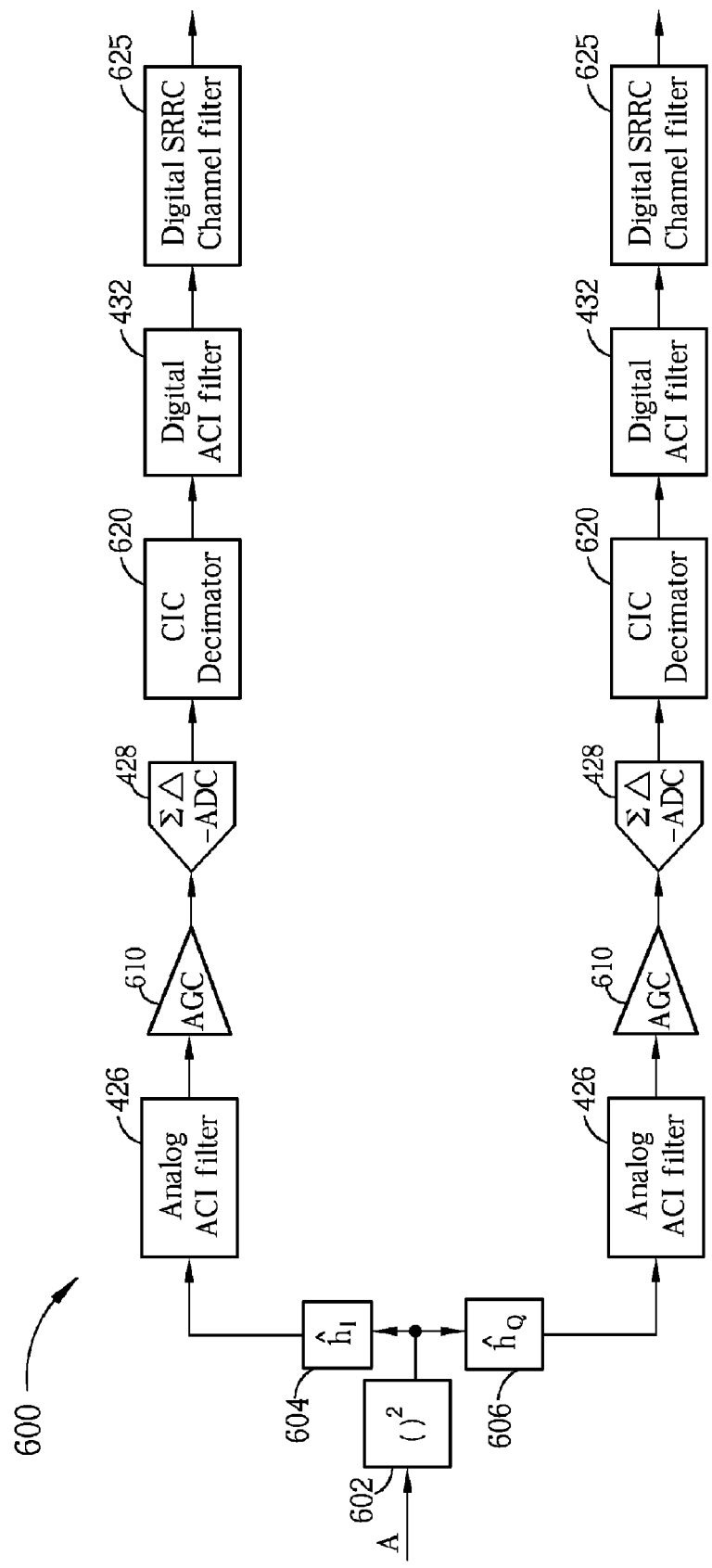
FIG. 6 illustrates an example of a receiver baseband processing model of the receiver path of FIG. 4.

Referring now to FIG. 6, an example of a receiver baseband processing model 600, of the receiver path of FIG. 4, is illustrated. The receiver baseband processing model 600 comprises a squaring module 602, which equates to the parasitic coupling path effects between the radio frequency port and the local oscillator port of the receiver mixer-stage 420 of FIG. 4. The squaring effect results from self mixing of the leakage signal, as previously described with respect to FIG. 5. The receiver baseband processing model 600 further comprises two independent adaptive FIR filters, $\hat{h}_I(n)$ 604 and $\hat{h}_Q(n)$ 606, which may allow for a more complex receiver baseband processing IMD2 model, beyond that of a standard gain relationship. The receiver baseband processing model 600 further comprises respective 'I' and 'Q' analogue adjacent channel filter 426, followed by analog AGC stages 605 (not shown in FIG. 4), which are also coupled to ΣΔ-ADC (with associated signal shaping) 428. The receiver baseband processing model 600 further comprises respective 'I' and 'Q' a decimator containing a CIC filtering (and any associated compensation/decimation stage) 620 followed by respective digital adjacent channel interference filters 432 and the digital SRRC channel filters 625 (also not shown in FIG. 4).

For simplicity purposes only, the DC or offset correction system/model has not been included in the exemplary models of FIG. 5 or FIG. 6. Although offsets have a profound effect on the canceller performance, and in particular the estimator that trains or adapts the IMD2 FIR coefficients, the DC effect is treated separately and is not modelled explicitly.

In one example, it is assumed that the analogue adjacent channel interference filters 426 and analog AGC 610 are matched, inasmuch as it is assumed that their differential mismatch is negligible. In this regard, it is possible to simplify the model of FIG. 6 further, to a point where a common gain and filter are used to represent the baseband processing.

Thus, the known art of US2008/0232268 discloses a receiver chain that proposes a use of a common digital 'I' and 'Q' processing path. Consequently, the prior art of US2008/0232268 proposes the use of a single gain stage. Thus, in one example, as described above, the present invention discloses a wireless communication unit that solves a problem of how to provide a more accurate cancellation of IMD2 products by provision of a digital processing chain that accommodates independent $2^{nd}$ order 'I' and 'Q' paths. In one example wireless communication unit, the baseband signals are quadrature baseband signals. The example wireless communication unit comprises an adaptive estimator module that comprises a baseband processing module arranged to: receive the quadrature baseband transmit signal and quadrature baseband receive signal. The adaptive estimator module is further arranged to apply independent gain and phase adjustment to quadrature portions of the quadrature baseband transmit signal, based on at least one signal component of the quadrature baseband receive signal, to form independent cancellation signals. The adaptive estimator module is further arranged to apply the independent cancellation signals to the summation module.

Adaptive Estimator

In one example embodiment, the cancellation of second order intermodulation distortion components is performed by an adaptive estimator, for example in a form of a least mean square (LMS) adaptive estimator. A general form of the LMS equation may be provided by:

$$\hat{\theta}(n) = \hat{\theta}(n-1) - \mu \frac{\partial \varepsilon(n)}{\partial \hat{\theta}(n-1)} \varepsilon(n) \quad [9]$$

where:

$\hat{\theta}(n)$ is the M×1 row vector of parameter estimates at the $m^{th}$ sample index; and M is the number of parameters to be estimated, $\varepsilon$ is the estimation error, and $\mu$ is the step-size or adaptation rate that may be chosen to trade off speed of convergence versus noise rejection.

The basic principle of applying equation [9] to a specific case of IMD2 cancellation is illustrated in FIG. 4, where the cancelled output becomes the estimation error which is fed back to the LMS update equation. To maximize the estimation error signal (e.g. the signal-to-noise ratio (SNR)) the feed back point may be taken after the receive digital channel—square root raised cosine (SRRC) filter, leading to the estimation error for the 'I' path (noting the 'Q' path has a similar expression) of:

$$\varepsilon_I(n) = I(n) - \hat{I}_{IMD2}(n) \quad [10]$$

The generic derivative term $\partial \varepsilon(n)/\partial \hat{\theta}(n-1)$ becomes for the IMD2 cancellation application $$\frac{\partial \varepsilon_I(n)}{\partial \hat{h}_I(n-1)} = -\frac{\partial \hat{I}_{IMD2}(n)}{\partial \hat{h}_I(n-1)} \quad [11]$$

Hence, the estimated IMD2 term (for the 'I' path) is provided by:

$$\hat{I}_{IMD2}(n) = \hat{g}_{txrx} \sum_{m=0}^{M_I-1} \hat{h}_I(m, n-1) A^2(n-m) \quad [12]$$

where:

the AM-squared term, $A^2$ is the output of the fixed, deterministic filter model line-up, as shown in FIG. 4.

In one example, the term $\hat{h}_I(m)$ may be replaced by $\hat{h}_I(m, n-1)$, where, as before, m is the $m^{th}$ coefficient of the FIR filter, whilst the additional (time) index, n−1 is now included to signify the underlying time-varying nature of the filter arising from the adaptation or adjustment by the LMS algorithm. Thereafter, the derivative term reduces to:

$$\frac{\partial \varepsilon_I(n)}{\partial \hat{h}_I(n-1)} = -A^2(n)\hat{g}_{txrx} \quad [13]$$

Here $\hat{h}(n-1)$ is a M×1 row vector of FIR taps or coefficient estimates (corresponding to the vector of parameter estimates, $\hat{\theta}(n-1)$ in the generic LMS equation), as distinct from the scalar or individual coefficient, $\hat{h}(m, n-1)$ at time index n−1. Similarly, $A^2(n)$ is a M×1 row vector, whilst $A^2(n-m)$ is the associated $m^{th}$ entry of that vector. The gain term $\hat{g}_{txrx}$ is a positive scalar value and in one example does not include any directional information in the form of phase or sign. Furthermore, removing the gain term to give the normalized derivative term in equation [14]:

$$\frac{\partial \varepsilon_I(n)}{\partial \hat{h}_I(n-1)} = -A^2(n) \quad [14]$$

facilitates a more efficient implementation as its numerical range can be limited to a positive scalar value between '0' and '1'. Substituting this term back into the LMS equation provides the update algorithm for the $m^{th}$ coefficient:

$$\hat{h}_I(m,n) = \hat{h}_I(m,n-1) + \mu A^2(n-m)\varepsilon_I(n) \quad [15]$$

An identical derivation yields the update equations for the Q path $$\hat{h}_Q(m,n) = \hat{h}_Q(m,n-1) + \mu A^2(n-m)\varepsilon_Q(n) \quad [16]$$

Each tap or coefficient may be updated according to these equations leading to the vector notation (or family) of equations:

$$\begin{bmatrix} \hat{h}_I(0,n) \\ \hat{h}_I(1,n) \\ \vdots \\ \hat{h}_I(M-1,n) \end{bmatrix} = \begin{bmatrix} \hat{h}_I(0,n-1) \\ \hat{h}_I(1,n-1) \\ \vdots \\ \hat{h}_I(M-1,n-1) \end{bmatrix} + \mu \begin{bmatrix} A^2(n) \\ A^2(n-1) \\ \vdots \\ A^2(n-M-1) \end{bmatrix} \varepsilon_I(n) \quad [17]$$

DC Offset & Low Frequency IMD2 Disturbance Modification

The basic estimation algorithm discussed above may fail in some circumstances in the presence of real world imperfections, specifically due to non-IM2 DC offsets. Although for WCDMA, which has −3 dB or 50% of the total (2-tone) IMD2 power falling at DC (with even a larger proportion for a WCDMA IMD2 power relative to the final baseband power), the inventor of the present invention has determined that other DC offsets may masquerade as a genuine IMD2 DC component, thereby corrupting the estimates and leading to potentially degraded cancellation performance. The above LMS estimator is based on the fundamental principle that all non IMD effects are uncorrelated with the reference signal. DC is always correlated with DC, regardless of its source, and hence non IMD2 DC will be correlated with IMD2 DC. If the other DC offsets are large enough, the IM2 estimator will become severely biased with resultant failure of the canceller.

One example solution to the above potential for real world imperfections to potentially degrade cancellation performance is to tap off the error feedback point after the receiver DC correction system. However, this will add substantial latency and complexity to the cancellation path, as now the dynamics of the DC correction system must be modelled or replicated within the cancellation path. A more cost effective solution may be to introduce a localized DC removal block within the canceller by high-pass filtering the error signal prior to its application to the estimation algorithm.

However, the problem is further compounded by the presence of low frequency IM2 disturbances arising from un-modelled variations in either the transmit and/or receive gain. For example, due to gain errors in modelling either or both the transmit and/or receive gain, when the transmit power target is modified at the slot rate (1.5 kHz) IM2 disturbances at 1.5 kHz are introduced to the system. These disturbances cannot be modelled by the canceller as they originate from either transmit and/or receive gain errors, or uncertainties, and hence can only be rejected in a classical closed loop negative feedback type fashion. Any attenuation introduced by the localized DC correction, high pass filter (HPF) at 1.5 kHz will reduce this negative feedback regulation gain by an amount equal to the HPF attenuation and, hence, compromise the canceller's ability to reject such disturbances. In a similar fashion, AM-AM distortion incurred in the PA may result in another source of low frequency IM2 disturbances.

It is important that the selectivity of the HPF be designed carefully such that low frequency IM2 disturbances can be adequately rejected by the canceller. Any localized HPF should have a selectivity that simultaneously rejects DC or static offsets (e.g. <100 Hz) whilst minimizing attenuation or rejection at the slot rate (>=1.5 kHz).

Furthermore, selectivity is also critical from the viewpoint of adapting or training the IMD2 FIR filters. Removal of signal content at any frequency will lead to poorer training of the adaptive filter at these frequencies. This phenomenon is referred to as 'persistent excitation' or 'sufficient excitation' in the known literature. In simple terms; if the objective is to train the adaptive filter in a certain frequency range, then the training signal must have sufficient spectral power in this range. It is unavoidable that the DC signal content must be removed, as there is no way to distinguish between IM2 DC and non IM2 DC. However, in doing so, the removal of other low frequency content should be minimized so as to not compromise the training at those frequencies. Accordingly, the selectivity of the HPF is paramount to ensure the low frequency accuracy of the adaptive filters. This is particularly important again given that more than 50% of the baseband IM2 power is at low frequencies. As the requirement of sufficient excitation becomes more important with increasing order and complexity of the adaptive filter, the selectivity of the HPF will also be more important for the extended multi-tap FIR IMD2 model than the classical single-tap, gain based model.

In addition to adequate selectivity, the HPF must be able to reject or track out non IMD2 static offsets above a specific minimum (referred to as the low noise amplifier (LNA) input (i/p)) sufficiently fast enough that the IMD2 estimator can converge. DC tracking or removal to less than a lower value within fractions of a slot (e.g. 100 us) is thus required. This is the classic trade-off of filter bandwidth versus selectivity. In summary, the HPF must have sufficient selectivity to adequately reject static DC offsets of, say, a magnitude approximately in a range of 1-100 uV (referred to LNA i/p) in fractions of a slot length (~100 us) with minimal attenuation at 1.5 kHz.

One example solution described below is to augment the IM2 estimator with a LMS DC estimation stage. The local estimation error determined within the estimator block is then subtracted off the LMS DC estimate. The DC estimate equation is provided by:

$$\hat{I}_{dc}(n) = \hat{I}_{dc}(n-1) + \mu_{dc}\Delta\epsilon_I(n) \quad [18]$$

$$\hat{Q}_{dc}(n) = \hat{Q}_{dc}(n-1) + \mu_{dc}\Delta\epsilon_I(n)$$

Where:

$\Delta\epsilon$ is the DC corrected or high pass filtered estimation error $$\Delta\epsilon_I(n) = \epsilon_I(n) - \hat{I}_{dc}(n) \quad [19]$$

$$\Delta\epsilon_Q(n) = \epsilon_Q(n) - \hat{Q}_{dc}(n)$$

and $\epsilon$ is the original estimation error, i.e. the IM2 cancelled output as per equation [10].

The high-pass filtered error is then used in the basic IM2 adaptive filter coefficient update equation to provide the modified version:

$$\begin{bmatrix} \hat{h}_I(0,n) \\ \hat{h}_I(1,n) \\ \vdots \\ \hat{h}_I(M-1,n) \end{bmatrix} = \begin{bmatrix} \hat{h}_I(0,n-1) \\ \hat{h}_I(1,n-1) \\ \vdots \\ \hat{h}_I(M-1,n-1) \end{bmatrix} + \mu \begin{bmatrix} A^2(n) \\ A^2(n-1) \\ \vdots \\ A^2(n-M-1) \end{bmatrix} \Delta\epsilon_I(n) \quad [20]$$

with a corresponding equation for the Q-path.

This is equivalent to introducing an IIR based HPF along the estimation error path between the IM2 cancellation point with $\epsilon$ as the input and $\Delta\epsilon$ as the output having the lead-lag or pole-zero transfer function of:

$$\frac{1 - z^{-1}}{1 + \mu_{dc} - z^{-1}} \quad [21]$$

The HPF has a zero at z=1 and a pole located at $z = 1/(1+\mu_{dc})$.

The digital differentiator term; $1-z^{-1}$ removes the static DC whilst the pole can be positioned via a suitable choice of $\mu_{dc}$ to affect the required selectivity versus bandwidth (settling time) trade off. For example, as $\mu_{dc} \to \infty$ the pole $\to 0$ and the HPF tends towards a pure digital differentiator. In this case the settling time will be less than '1' clock period. However, the selectivity, particularly at a critical frequency of 1.5 kHz will be compromised to the extent that low frequency IM2 disturbance will be inadequately regulated by the loop. Moreover, training of a multi-tap adaptive filter will be poorer due to diminished spectral content over the stop band of the filter. Conversely, at the other extreme as $\mu_{dc} \to 0$ the pole tends towards unity or towards the zero systematically improving selectivity, but at a cost of progressively longer settling in order to track out a given level of DC offset.

(Obviously for $\mu_{dc}=0$ there is no DC rejection as the pole cancels with the zero or the settling time is infinite).

It is useful to highlight that the HPF error, $\Delta\epsilon(n)$, is only used locally within the LMS estimator whilst the error, $\epsilon(n)$ is used as the corrected or IM2 cancelled output for the remainder of the radio/modem line-up. In this manner, the HPF effect advantageously only occurs within the estimator. Instead, if $\Delta\epsilon(n)$ was used as the IM2 cancelled output and input to the remainder of the modem the high pass filtering effect could potentially degrade the signal SNR by removing low frequency components of the wanted signal.

Re-Partitioning of Baseband Filter

Referring back to FIG. 4, the principal building blocks and input/output signals to/from the example LMS adaptive estimator 458 are illustrated. The cancelled or corrected output, 454, 456 is high pass filtered by the DC estimate-correction stage, 466 and used as the error signal to be applied to the LMS engine, 468.

In accordance with one example embodiment, the adaptive estimator module is arranged to tap off a portion of the baseband transmit signal following adjacent channel interference filtering and prior to a gain stage applying a gain to the filtered baseband receive signal. In this manner, the derivative or regressor input, $A^2$, 444 is tapped off prior to the gain term $\hat{g}_{rxrx}$ 446 and input to adaptive estimator module 458 (noting that according to the strict derivation of the equations it may be tapped off after the gain term). In one example, this departure from a more classic-based approach is adopted for implementation reasons, as $A^2$ 444 will have a much reduced dynamic range thereby leading to a more cost effective bit width requirement. In an alternative example, where $A^2$ is tapped out after the gain stage 446, a larger dynamic range is required, for example in the order of 50 dB in order to track the automatic gain control (AGC) range from approximately −110 dBM to −80 dBm and a 30 dB range, plus a 2 dB-by-10 dB range to track the output power from maximum to approximately 10 dB below). The gain or adaptation rate engine or algorithm can be modified and easily compensated through the step-size term, $\mu$, 470, for example in a sense that the gain term may be considered as being embedded into a step-size. Basically by tapping off 444 prior to 446 it is possible to save on hardware costs as the fixed point word size requirement is reduced. However, the gain line-up changes as a result, which in one example embodiment may be compensated by modifying the adaptation rate. Gain stage 446 and step-size term, $\mu$, 470 effect gains within the cancellation loop. Depending upon where the signals are tapped off such gains may affect the transient response of the loop. Thus, tapping off signal 444 prior to gain stage 446 changes the transient, which in one example embodiment may be controlled by modifying step-size term, $\mu$, 470. In the described example, the step-size or adaptation rate, $\mu$, 470 is generated based on the current estimate of the on-channel power and fed into the LMS update engine 458. The update estimates are then fed to their respective filters 468 in the cancellation subsystem.

The known art of US2008/0232268 discloses a placement of the digital adjacent channel interference (ACI) filter after the tapping of the error signal in the receiver chain. In this manner, the known adaptive estimator removes or attenuates adjacent channel interference. However, the inventor of the present invention has recognised and appreciated that such a design is only reliable in a steady-state, static condition with the adaptive filters fully converged, otherwise the delay through the receiver line-up is too long in terms of adaptation time for the canceller. Hence, the known art of US2008/0232268 discloses a suboptimal filter partitioning that results in an impractical and uneconomical solution.

In contrast, in the above described example, a mechanism for independently trading off ACI rejection versus settling time is presented. Thus, a novel receiver architecture is provided by locating the cancellation point before the ACI filter but with a feedback tap point located after the ACI filter, in order to partition the cancellation node to provide a more accurate cancellation of IMD2 products. As all the blocks/functions included in the line-up up to the actually point of cancellation have to be modelled along the cancellation path, it is preferable to insert the cancellation point and tap off the feed back point as early in the line-up as possible in order to simplify the cancellation model. In the above example, the ACI filter is modelled as a latency value 460, which has been determined as being sufficient for cancellation purposes. In particular, the receiver architecture partitions the cancellation node across digital baseband filtering stages, thereby basing the estimate on the current on-channel power level. In this manner, the estimator is able to converge faster and therefore reject more noise.

The example receiver architecture may be implemented in a wireless communication unit that comprises a transmitter arranged to process a baseband transmit signal to produce a first radio frequency signal for wireless transmission and a receiver arranged to receive a second radio frequency signal and convert the second radio frequency signal to a baseband receive signal. The receiver comprises an analogue-to-digital converter operably coupled to a summation module arranged to add a cancellation signal to the baseband receive signal. The receiver further comprises a selectivity element that is arranged to couple the transmitter and the receiver to an antenna, such that a reduced portion of the first radio frequency signal is introduced into the second radio frequency signal thereby creating a second order inter-modulation distortion component in the baseband receive signal. The receiver further comprises a digital adjacent channel filter located in the receiver to filter signals output from the summation module; and an adaptive estimator module arranged to receive the output filtered signals and the baseband transmit signal and produce the cancellation signal based thereon.

Adaptation Rate Algorithm

The adaptation rate, $\mu$, 470 controls the rate at which the estimates converge and, therefore, the ability of the adaptive estimator 458 to reject noise. The larger the adaptation rate, $\mu$, 471, the faster the rate of convergence but the poorer the noise rejection, and vice versa. All received 'I' and 'Q' signals that are uncorrelated to the transmit AM-squared signal appear as noise to the adaptive estimator 458. As this noise level increases, the adaptation rate, $\mu$, 471 should be turned down proportionally. Such uncorrelated noise arises from obvious sources, such as thermal noise in the analogue front end, data converter quantisation noise and also from less obvious sources, such as the wanted receive signal itself, $\hat{I}_{OR}$. In addition, $IM_3$, cross modulation and all other receiver front end impairments will contribute to this uncorrelated noise. Essentially, all contributors to the total on-channel signal, except the IMD2 effect and DC offsets, appear as uncorrelated noise. In one example, as this noise floor varies the adaptation rate, $\mu$, 471 is adjusted inversely to retain a desired level of noise rejection.

The automatic adjustment of the adaptation rate is accomplished by the dedicated system 472. In one example, the digital in-band power detection of the AGC system is advantageously reused to obtain a dynamic estimate of the on-channel power. The estimated power value is used to index a look-up table (LUT) 470, whose entries are scaled to provide an adaptation rate that varies inversely with the square root of the power estimate. In a simplified example the LUT 470 implements a $1/\sqrt{x}$ function, or more generally the function $\mu_0/\sqrt{x}$, where x is proportional to the detected power ($V^2$) and $\mu_0$ is a constant chosen to scale the step-size output to work over the designated power range (from sensitivity to approximately −80 dBm). For on-channel power levels that are determined as being at a received signal power level that is lower than the communication unit's receiver sensitivity level, the step-size $\mu=\mu_0$ may be used, whilst for power levels above the upper limit, $\mu=0$, (i.e. the estimator algorithm is turned 'off') and for intermediate levels the rate is arranged to be varied, for example from $\mu_0$ to 0 in a $1/\sqrt{x}$ fashion.

Adaptation Rate Engine

A fixed point implementation of an example adaptation rate block is illustrated in FIG. 4. In the aforementioned examples, it is envisaged that a typical AGC power detection module, as known in the art, may be used and is thus not described herein further for simplicity purposes. In one example, the LUT 470 may be stored with unsigned, 12 b fractional values that, say, span a 30 dB range from $\mu_0$ to $\mu_0 \sqrt{10^{-30/20}}$ in a $1/\sqrt{x}$ fashion.

In one example, a RAM based LUT 470 is configured to facilitate a programmability of $\mu_0$ values. In one example, the LUT 470 may also, as a contingency measure, be configured to facilitate a programmability of $1/\sqrt{x}$ values if the profile proves inadequate. In one example, an address scheme employed to access the LUT 470 may be scaled, such that the maximum values is read out when the minimum (or lower) power is detected (e.g. when the receiver is at, or approaching, its sensitivity level, e.g. where $\hat{I}_{or}$ is typically approaching −110 dBm and $\hat{I}_{oc}$ is approaching −102 dBm (principally a thermal noise level)). In this example, for power levels within a 30 dB window above this minimum (for example at −110 dBm) the LUT 470 may be arranged to output a word that is inversely proportional to the square root of the detected power. For power levels below this upper limit, a zero valued may be read out of the LUT 470. Thereafter, this normalised LUT output may then be scaled by a programmable gain, $\mu$ whose product provides the adaptation rate for the LMS estimator.

Thus, the known art of US2008/0232268 discloses a receiver chain that has a fixed $\mu$ adaptation rate gain. Hence, US2008/0232268 discloses a mechanism that cannot adapt to a typical practical situation, for example where the receive signal may vary dynamically over a large range (say, from ~−115 dBm to ~−80 dBm). Thus, the mechanism disclosed in US2008/0232268 produces a suboptimum performance. Therefore, in one example as described above, a novel automatic regulation of adaptation rate is provided in order to provide a more accurate cancellation of IMD2 products. In particular, the receiver architecture discloses a mechanism that automatically scales the adaptation rate gain with the receive signal power.

The example receiver architecture may be implemented in a wireless communication unit that comprises a transmitter arranged to process a baseband transmit signal to produce a first radio frequency signal for wireless transmission and a receiver arranged to receive a second radio frequency signal and convert the second radio frequency signal to a baseband receive signal wherein the receiver comprises a summation module arranged to add a cancellation signal to the baseband receive signal. The wireless communication unit further comprises a selectivity element that is arranged to couple the transmitter and the receiver to an antenna, such that a reduced portion of the first radio frequency signal is introduced into the second radio frequency signal thereby creating a second order inter-modulation distortion component in the baseband receive signal. The wireless communication unit further comprises a power measurement module arranged to measure an on-channel power level of the baseband receive signal. The wireless communication unit further comprises an adaptive estimator module operably coupled to the power measurement module and arranged to receive the first baseband transmit signal and the baseband receive signal wherein the adaptive estimator module comprises a baseband processing module arranged to determine an adaptation rate to be used by the adaptive estimator module in generating the cancellation signal based on the measured on-channel power level of the baseband receive signal.

A paper titled "An integrated LMS adaptive filter of Tx leakage for CDMA receiver front ends" by Qualcomm and published in the IEE in May 2006 proposes a continuous-time, analogue based adaptive interference cancellation system solution. This document proposes to tap off a radio frequency reference after the power amplifier and proposes to remove any transmit leakage prior to a non-linear down-mixing stage, thereby preventing IM2 being generated. Although the underlying principle of adaptive interference cancellation holds, the known prior art suffers from the classical analogue problems of; DC offsets, degraded noise figure and current consumption The known techniques focus on calibrating an adaptive IP2 measurement and responding to the calibration, in order to solve the primary problem of limiting the receiver mixer $2^{nd}$ order intermodulation products. For example, the known art teaches how to tune or calibrate the receiver RF front-end circuits and devices, so as to maximize its IP2 power level and hence minimize the $2^{nd}$ order intermodulation products. In contrast, the proposed technique proposes a cancellation technique.

Time Alignment of Cancellation Signal

Time misalignment between the actual transmit-receive IMD2 path and the cancellation model may occur due to phase mismatch between the analogue filters and their digital model equivalent. In addition, further time delay mismatch may occur due to unaccounted for register delays in either path. Although the adaptive structure of the IMD2-FIR filter may, in some instances, correct for such time misalignment it is not the most efficient mechanism for compensating for pure latency or constant group delay mismatch. For example, by arbitrarily increasing the number of taps, an arbitrary misalignment can be corrected for. However, this approach adds not only further complexity to the actual filter itself but also to the adaptive LMS estimator as well as extending its convergence time. Accordingly, in some herein described examples, a dedicated time alignment block is included to correct for time misalignment.

In example embodiments, a fixed programmable delay line is included in both the cancellation path, $\hat{D}$ and the actual transmit or receive IMD2 path, $D_0$. Inclusion of a delay, $D_0$, as illustrated by delay 440 along the cancellation path of FIG. 4, along the actual transmit-receive path covers the eventuality of where the cancellation path delay is longer than the actual delay. In FIG. 4, the delay, $D_0$ 440 is illustrated as being inserted between the receiver ADC-CIC and the IMD2 cancellation node.

An adaptive IMD2 FIR filter structure is included to track out filter mis-modelling and filter variations, as well as correct for a limited range of unknown time misalignments. In principle, by extending the tap count it is possible to correct for time misalignments of arbitrary length. However, given that such misalignment will be dominated by unknown but fixed digital time delays, which will only need to be corrected once, such an approach (i.e. increased FIR tap count), is hardware inefficient. Instead a dedicated self-tuning time alignment system is included for this purpose.

Figure 7:
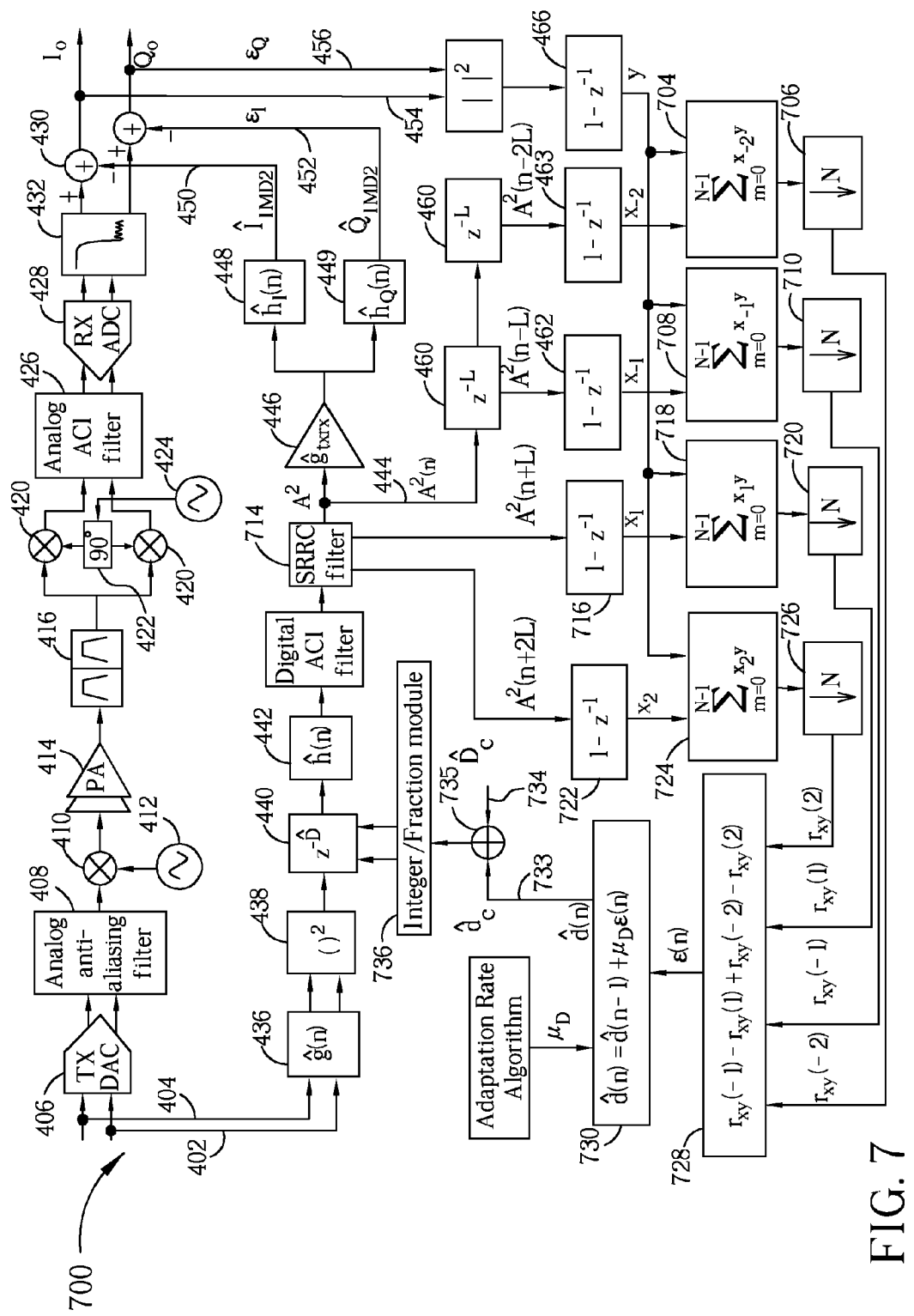
FIG. 7 illustrates an example of a self-tuning delay mechanism, for example to complement a fixed delay synchronisation technique.

Referring now to FIG. 7, and in order to complement the fixed delay synchronisation, a self-tuning delay mechanism 700 is included that is arranged to dynamically adjust the programmable delay value $\hat{D}_c$ with $\hat{d}_c$ so as to equalise the path delays. A composite delay from both paths, provided by summing logic 735, is then applied to the tapped delay line 440 in an integer and fractional format via an integer/fraction module 736, as shown.

Self-Tuning Time Alignment System

A firmware or hardware based implementation, or a software/firmware-based tuning algorithm, is based on an extension to the principle of peak correlation. The basic principle in the example of a self-tuning alignment system is based on the fact that if the time misalignment between the actual output and the estimated output is $kT_s$, where $T_s$, is the common underlying sampling period, then the corresponding cross correlation will be a maximum or peak at lag k. The time misalignment is then measured by resolving the cross correlation to a fine enough accuracy and establishing at what lag value the correlation is a maximum. However this conventional application of the principle can lead to a hardware inefficient implementation that is arguably as costly as increasing the adaptive FIR filter tap count. For example, in order to resolve the misalignment to better than $\frac{1}{16}^{th}$ of a chip period over a range of +/−2 chips would require 2×16×2 multiple and add structures.

An alternative approach described herein evaluates the cross correlation at only 4 lag values. These values are then combined (using equation [23] in logic/function module 728) to provide an error type function that has an approximate linear relationship with the time misalignment. The error function is then used to drive a simple digital controller 730, which adjusts the delay 440 in the digital tapped time alignment so as to minimize this error.

More specifically, in this example and assuming the time misalignment is limited to a range of +/−2 chips, the cross correlation at lag values of +/−1 chip (using a first delay 460) and +/−2 chips will suffice (using two delays 460). The cross correlation function in determining a cross correlation value between a sample WCDMA amplitude squared signal and its delayed value for lag values of +/−1 and +/−2 chips respectively is related to the pulse response of the SRRC filter 714 used in the generation of the WCDMA signal. In this manner, a maximum or peak that is clearly evident, where the lag equals the time misalignment and falls off in a SRRC pulse type fashion, is used as the misalignment deviates from zero.

Let us define the normalized cross correlation at +1 chip advance as $r_{xy}(1)$ and at 1 chip lag or delay as $r_{xy}(-1)$. Let us further define a function that is approximately proportional to the time misalignment value within a window of +/−1 chip period from:

$$\epsilon = r_{xy}(-1) - r_{xy}(1) \quad [22]$$

This error function behaves well within a range of +/−1 chip, but degrades beyond that point and eventually takes on the wrong sign as the misalignment approaches +/−2 chips. To improve the error function accuracy over a +/−2 chip range one example embodiment modifies the error equation by incorporating the cross correlation function at +/−2 chip lag (using logic/function module 728) as follows:

$$\epsilon = r_{xy}(-1) - r_{xy}(1) + r_{xy}(-2) - r_{xy}(2) \quad [23]$$

The resultant error function sign is now correct over the +/−2 chip misalignment window. It is possible to further improve the linear relationship of the error function to the time misalignment over an arbitrary window at the expense of additional cross correlation lag entries. However, assuming the timing misalignment is limited to +/−2 chips, then the error function of equation [23] composed of lags at +/−1 chip and +/−2 chips is accurate enough to drive the subsequent control loop.

In this example, four delayed versions 716, 462, 463, 466 of the amplitude squared signal, $A^2$ are generated corresponding to the signal advanced by 2 chips, advanced by 1 chip, delayed by 1 chip and delayed by 2 chips, i.e. the vector of variables are generated as provided in equation [24];

$$\{A^2(n+2L)A^2(n+L)A^2(n-L)A^2(n-2L)\}, \quad [24]$$

where:

n is the current index and

L is an index offset corresponding to 1 chip period.

In practice, given that the SRRC filter 714 along the cancellation path in this example is implemented as an FIR filter of the form:

$$A^2(n) = \sum_{k=0}^{N-1} c_k A_i^2(n-k), \quad [25]$$

where:

$A_i^2$ is the SRRC input amplitude squared signal and $c_k$ is the $k^{th}$ Coefficient of the SRRC filter 714, an approximation to the advanced signals, $A^2(n+2L)$ and $A^2(n+L)$ will be available from the regressor or delay line employed within the SRRC filter itself.

In particular, if the SRRC is designed to run at Lx the chip rate, tapping off the internal regressor 2L and L from the end of the delay line, i.e. $A_i^2(n-N+2L+1)$, $A_i^2(n-N+L+1)$ yields an approximation to the advanced signals $A^2(n+2L)$ and $A^2(n+L)$. The actual output of the SRRC filter 714 is delayed by additional delay elements to produced the delayed or lagged values $A^2(n-L)$ and $A^2(n-2L)$ Depending on the order of the adaptive IMD2-FIR filter, these delay values 460 may already be available from the adaptive FIR regressor delay line.

The DC component from of an amplitude squared regressed vector and the error amplitude is then removed via the digital differentiator, 722, 462, 463 and 466 before the correlation step, as such offsets that are unrelated to time misalignment and could dominate the correlation result, and hence degrade the overall accuracy. The notation $x_2$ is used to represent the DC notched, 2 chip advanced amplitude squared signal, $x_1$ the corresponding single chip advanced signal, $x_{-1}$ the single chip delayed and $x_{-2}$ the 2 chip delayed signal. y is used to represent the DC notched amplitude square error signal.

An integrate-and-dump function/module 726, 720, 710, 706 is then applied to the product 724, 718, 708, 704 of each of these delay terms; $\{x_2, x_1, x_{-1}, x_{-2}\}$ and y to effect the desired correlation operation. The integration window length, N, in one example, is programmable and extends over a programmable binary fraction of a slot length, such as $\frac{1}{16}^{th}$, $\frac{1}{8}^{th}$, $\frac{1}{4}^{th}$, $\frac{1}{2}$, 1, and 2.

The error function in equation [23] from logic/module 728 is then generated from the respective cross correlation terms at the integrate and dump output rate and applied to a basic integral controller 730.

$$\hat{d}(n) = \hat{d}(n-1) + \mu_D \epsilon(n) \quad [26]$$

where:

$\hat{d}(n)$ is the corrected or update for the self-tuned time alignment estimate, and $\mu_D$ is an adaptation rate which scales with detected on-channel power.

In a similar manner to the use of the step-size term, $\mu$, 470, in FIG. 4 where the adaptation rate is scaled inversely with the square root of the on-channel power, the control equation may also be scaled with respect to square root of the on-channel power as described previously.

The delay estimate $\hat{d}$ 733 is added to the programmable delay estimate, $\hat{D}_c$ 734 to provide the composite delay, which is then decomposed into its integer and fractional components in integer/fraction logic/module 736 and applied to the delay 440 in the cancellation delay line.

In a yet further example embodiment, a limiting scheme may be employed where the estimate, $\hat{d}$ is constrained within the boundary: $-\hat{D}_c \leq \hat{d} \leq \max\{\hat{D}\} - \hat{D}_c$, where $\max\{\hat{D}\}$ is the upper limit of the delay line. In this example, an option of extending below the lower bound, $-\hat{D}_c$ may be available by increasing the intentional delay, $D_0$ along the actual transmit-receive, IMD2 path, i.e. instead of reducing the cancellation delay by decreasing $\hat{d}$ below $-\hat{D}_c$, the intentional transmit-receive delay may be increased. This implementation is preferably programmable to avoid varying the actual transmit or receive path delay at certain time instances, for example during a live call.

Thus, the prior art of US2008/0232268 discloses a peak detector that selects a lag value to time align the cancellation signal, where a maximum cross correlation value is determined in order to align two signals. However, such known prior art provides for only a rough correction for group delay variation due to analogue filter uncertainty in the receiver. Thus, in one example, a novel time alignment system to correctly time align the cancellation signal has been described. In particular, a self tuning time alignment system has been described to accommodate for group delay variation due to analogue filter uncertainty in the receiver by use of an error function and associated controller to perform time alignment of the cancellation signal.

The example self tuning time alignment system may be implemented in a wireless communication unit that comprises a transmitter arranged to process a first baseband transmit signal to produce a first radio frequency signal for wireless transmission, and a receiver arranged to receive a second radio frequency signal and convert the second radio frequency signal to a baseband receive signal wherein the receiver comprises a summation module arranged to add a cancellation signal to the baseband receive signal. The communication unit further comprises a selectivity element that is arranged to couple the transmitter and the receiver to an antenna. A reduced portion of the first radio frequency signal is introduced into the second radio frequency signal thereby creating a second order inter-modulation distortion component in the baseband receive signal. The communication unit further comprises a controller module arranged to perform cross-correlation of at least one tap of each of the first baseband transmit signal and the cancellation signal to produce an error signal that is representative of a time difference therebetween. A controllable delay element is operably coupled to the controller module and arranged to use the error signal to set a time delay applied to at least one from a group of: the first baseband transmit signal, the cancellation signal.

Although some aspects of the invention have been described with reference to their applicability to second order intermodulation distortion cancellation in a wireless communication unit that supports UMTS (Universal Mobile Telecommunication System) cellular communication system and in particular to a UMTS Terrestrial Radio Access Network (UTRAN) of a $3^{rd}$ generation partnership project (3GPP) system, it will be appreciated that the invention is not limited to this particular cellular communication system. It is envisaged that the concept described above may be applied to any other wireless communication system or technology.

Figure 8:
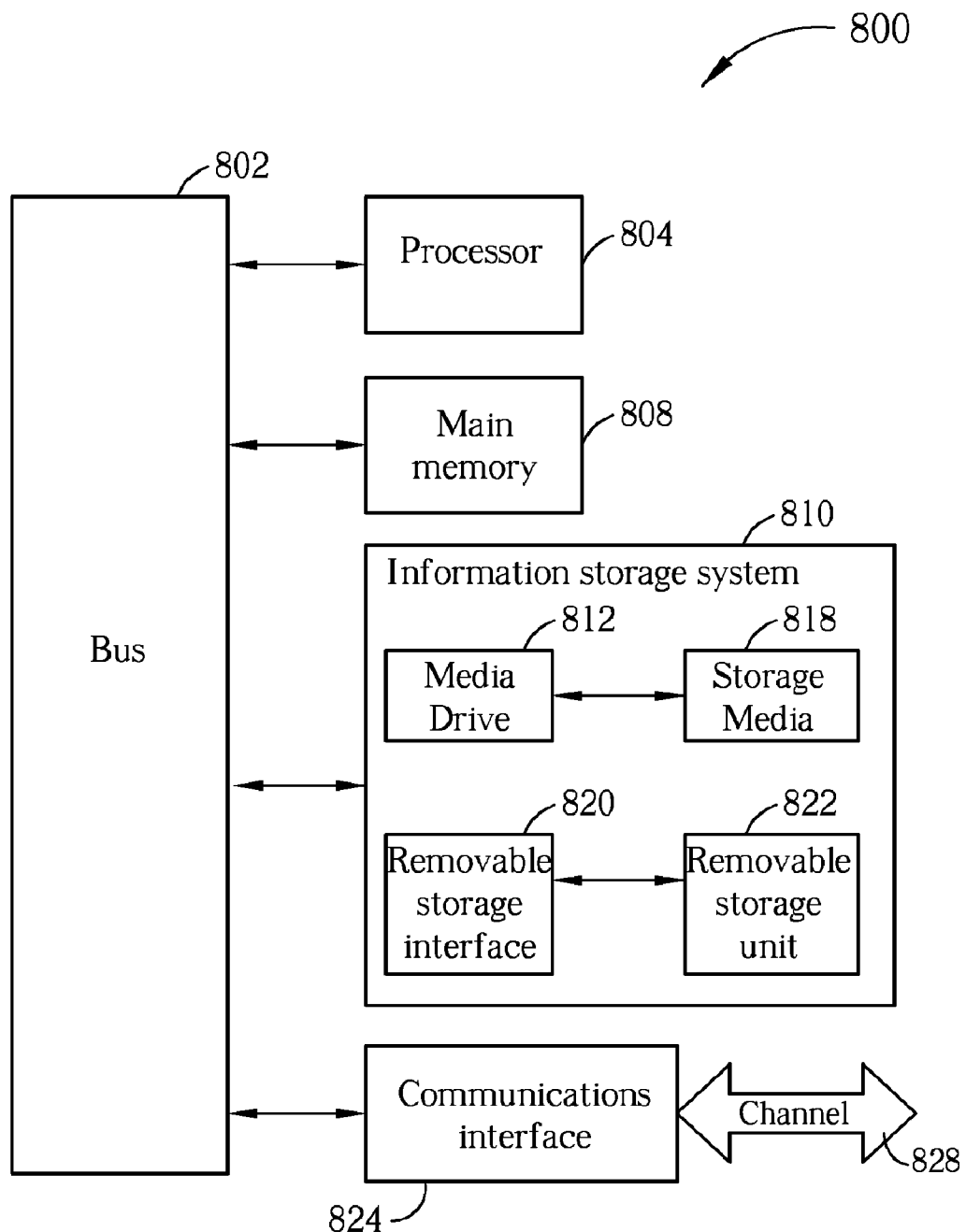
FIG. 8 illustrates a typical computing system that may be employed to implement signal processing functionality in embodiments of the invention.

Referring now to FIG. 8, there is illustrated a typical computing system 800 that may be employed to implement signal processing functionality in embodiments of the invention. Computing systems of this type may be used in access points and wireless communication units. Those skilled in the relevant art will also recognize how to implement the invention using other computer systems or architectures. Computing system 800 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 800 can include one or more processors, such as a processor 804. Processor 804 can be implemented using a general or special-purpose processing engine such as, for example, a microprocessor, microcontroller or other control module. In this example, processor 804 is connected to a bus 802 or other communications medium.

Computing system 800 can also include a main memory 808, such as random access memory (RAM) or other dynamic memory, for storing information and instructions to be executed by processor 804. Main memory 808 also may be used for storing temporary variables or other intermediate information during execution of instructions to be executed by processor 804. Computing system 800 may likewise include a read only memory (ROM) or other static storage device coupled to bus 802 for storing static information and instructions for processor 804.

The computing system 800 may also include information storage system 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 818 may include, for example, a hard disk, floppy disk, magnetic tape, optical disk, CD or DVD, or other fixed or removable medium that is read by and written to by media drive 812. As these examples illustrate, the storage media 818 may include a computer-readable storage medium having particular computer software or data stored therein.

In alternative embodiments, information storage system 810 may include other similar components for allowing computer programs or other instructions or data to be loaded into computing system 800. Such components may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 818 to computing system 800.

Computing system 800 can also include a communications interface 824. Communications interface 824 can be used to allow software and data to be transferred between computing system 800 and external devices. Examples of communications interface 824 can include a modem, a network interface (such as an Ethernet or other NIC card), a communications port (such as for example, a universal serial bus (USB) port), a PCMCIA slot and card, etc. Software and data transferred via communications interface 824 are in the form of signals which can be electronic, electromagnetic, and optical or other signals capable of being received by communications interface 824. These signals are provided to communications interface 824 via a channel 828. This channel 828 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 808, storage device 818, or storage unit 822. These and other forms of computer-readable media may store one or more instructions for use by processor 804, to cause the processor to perform specified operations. Such instructions, generally referred to as 'computer program code' (which may be grouped in the form of computer programs or other groupings), when executed, enable the computing system 800 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 800 using, for example, removable storage drive 822, drive 812 or communications interface 824. The control module (in this example, software instructions or computer program code), when executed by the processor 804, causes the processor 804 to perform the functions of the invention as described herein.

In particular, it is envisaged that the aforementioned inventive concept can be applied by a semiconductor manufacturer to any integrated circuit comprising transceiver modules, for example those of the MediaTek™ MT6162 transceiver IC family and those of the MediaTek™ MT6573 and MT6276, baseband processor family.

Furthermore, the inventive concept may be applied in an application-specific integrated circuit (ASIC) and/or any other sub-system element or one or more circuits.

It will be appreciated that, for clarity purposes, the above description has described embodiments of the invention with reference to different functional units and processors. However, it will be apparent that any suitable distribution of functionality between different functional units or processors, for example with respect to the beamforming module or beam scanning module, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved integrated circuits, communication units and methods therefor have been described, wherein the aforementioned disadvantages with prior art arrangements have been substantially alleviated.

What is claimed is:

1. A wireless communication unit comprising:
a transmitter arranged to process a quadrature baseband transmit signal to produce a first radio frequency signal for wireless transmission,
a receiver arranged to receive a second radio frequency signal and convert the second radio frequency signal to a quadrature baseband receive signal, wherein the receiver comprises at least one summation module arranged to add a cancellation signal to the quadrature baseband receive signal;
a selectivity element that is arranged to couple the transmitter and the receiver to an antenna, such that a reduced portion of the first radio frequency signal is introduced into the second radio frequency signal thereby creating a second order inter-modulation distortion component in the baseband receive signal; and
a baseband processing module arranged to:
receive the quadrature baseband transmit signal and quadrature baseband receive signal;
apply independent gain and phase adjustments to quadrature portions of the quadrature baseband transmit signal, based on at least one signal component of the quadrature baseband receive signal, to form independent cancellation signals; and
apply the independent cancellation signals to the at least one summation module.

2. The wireless communication unit of claim 1 wherein the baseband processing module comprises a plurality of independent adaptive filters.

3. The wireless communication unit of claim 2 wherein the plurality of independent adaptive filters comprise multi-tap finite impulse response (FIR) filters arranged to compensate for a mismatch error between the quadrature baseband receive signal and the quadrature baseband transmit signal.

4. The wireless communication unit of claim 1 further comprising:
a power measurement module operably coupled to the adaptive estimator module arranged to measure an on-channel power level of the baseband receive signal; and
wherein the adaptive estimator module comprises a baseband processing module arranged to determine an adaptation rate to be used by the adaptive estimator module in generating the cancellation signal based on the measured on-channel power level of the baseband receive signal.

5. The wireless communication unit of claim 4 wherein the baseband processing module is arranged to ignore uncorrelated noise components such that the cancellation signal cancels second order intermodulation distortion component.

6. The wireless communication unit of claim 1 wherein the receiver comprises an analogue-to-digital converter operably coupled to the summation module further comprising:
a digital adjacent channel filter located in the receiver and arranged to filter signals output from the summation module; and
wherein the adaptive estimator module is arranged to receive the output filtered signals and the baseband transmit signal and produce the cancellation signal based thereon.

7. The wireless communication unit of claim 6 wherein the digital filter is a digital adjacent channel filter.

8. The wireless communication unit of claim 7 wherein the digital adjacent channel filter comprises a matching filter.

9. The wireless communication unit of claim 1 further comprising:
a controller module arranged to perform cross-correlation of at least one tap of each of the first baseband transmit signal and the cancellation signal to produce an error signal that is representative of a time difference therebetween;
a controllable delay element operably coupled to the controller module and arranged to use the error signal to set a time delay applied to at least one from a group of: the first baseband transmit signal, the cancellation signal.

10. The wireless communication unit of claim 9 wherein the controller module is arranged to perform cross correlation between two signals evaluated at a number of Lag points.

11. The wireless communication unit of claim 9 wherein the controller module is arranged to adjust the controllable delay element until the error signal is at a minimum.

12. An integrated circuit for a wireless communication unit comprising:
a transmitter arranged to process a quadrature baseband transmit signal to produce a first radio frequency signal for wireless transmission,
a receiver arranged to receive a second radio frequency signal comprising a reduced portion of the first radio frequency signal and convert the second radio frequency signal to a quadrature baseband receive signal, wherein the receiver comprises at least one summation module arranged to add a cancellation signal to the quadrature baseband receive signal, and wherein the reduced portion of the first radio frequency signal creates a second order inter-modulation distortion component in the baseband receive signal; and
a baseband processing module arranged to:
receive the quadrature baseband transmit signal and quadrature baseband receive signal;
apply independent gain and phase adjustment to quadrature portions of the quadrature baseband transmit signal, based on at least one signal component of the quadrature baseband receive signal, to form independent cancellation signals; and
apply the independent cancellation signals to the at least one summation module.

13. The integrated circuit of claim 12 wherein the baseband processing module comprises a plurality of independent adaptive filters.

14. The integrated circuit of claim 13 wherein the plurality of independent adaptive filters comprise multi-tap finite impulse response (FIR) filters arranged to compensate for a mismatch error between the quadrature baseband receive signal and the quadrature baseband transmit signal.

15. A method for reducing a second order inter-modulation distortion component in a wireless communication unit, the method comprising:
processing a quadrature baseband transmit signal to produce a first radio frequency signal for wireless transmission;
receiving a second radio frequency signal comprising a reduced portion of the first radio frequency signal that creates a second order inter-modulation distortion component in the baseband receive signal;
converting the second radio frequency signal to a quadrature baseband receive signal;
applying independent gain and phase adjustments to quadrature portions of the quadrature baseband transmit signal, based on at least one signal component of the quadrature baseband receive signal, to form independent cancellation signals; and
adding the independent cancellation signals to the quadrature baseband receive signal to reduce the second order inter-modulation distortion component.

16. The method of claim 15 further comprising compensating for a mismatch error between the quadrature baseband receive signal and the quadrature baseband transmit signal by setting a plurality of multi-tap finite impulse response (FIR) filters.

17. A computer program product comprising executable program code for reducing a second order inter-modulation distortion component in a wireless communication unit, the executable program code operable for:
processing a quadrature baseband transmit signal to produce a first radio frequency signal for wireless transmission;
receiving a second radio frequency signal comprising a reduced portion of the first radio frequency signal that creates a second order inter-modulation distortion component in the baseband receive signal;
converting the second radio frequency signal to a quadrature baseband receive signal;
applying independent gain and phase adjustments to quadrature portions of the quadrature baseband transmit signal, based on at least one signal component of the quadrature baseband receive signal, to form independent cancellation signals; and
adding the independent cancellation signals to the quadrature baseband receive signal to reduce the second order inter-modulation distortion component.

18. The computer program product of claim 17 where the code is further operable for compensating for a mismatch error between the quadrature baseband receive signal and the quadrature baseband transmit signal by setting a plurality of multi-tap finite impulse response (FIR) filters.

19. The computer program product of claim 17, wherein the computer program product comprises at least one of a hard disk, a CD-ROM, an optical storage device, a magnetic storage device, a ROM (Read Only Memory), a PROM (Programmable Read Only Memory), a EPROM (Erasable Programmable Read Only Memory), an EEPROM (Electrically Erasable Programmable Read Only Memory) and a Flash memory.

* * * * *